United States Patent [19]

Tang et al.

[11] Patent Number: 5,219,937
[45] Date of Patent: Jun. 15, 1993

[54] PROCESS FOR PREPARING GRAFT AND BLOCK COPOLYMERS OF POLYPHENYLENE OXIDES AND POLYESTERS AND COPOLYMERS PREPARED BY SAID PROCESS

[75] Inventors: Reginald T-H. Tang, Warren, N.J.; Michael C. Bochnik, Yonkers, N.Y.; Frank Mares, Whippany, N.J.; Steve Arnold, New Hope, Pa.

[73] Assignee: AlliedSignal Inc., Morris Township, Morris County, N.J.

[21] Appl. No.: 898,280

[22] Filed: Jun. 15, 1992

Related U.S. Application Data

[62] Division of Ser. No. 446,512, Dec. 4, 1989, Pat. No. 5,124,411.

[51] Int. Cl.⁵ .................. C08L 69/00; C08L 71/12
[52] U.S. Cl. ..................... 525/67; 525/68; 525/146; 525/148; 525/151; 525/152; 525/394; 525/397; 525/905
[58] Field of Search ............... 525/67, 68, 146, 148, 525/151, 152, 394, 397, 905

[56] References Cited

U.S. PATENT DOCUMENTS

| | | | |
|---|---|---|---|
| 3,379,792 | 8/1965 | Finholt et al. | 260/857 |
| 4,315,086 | 7/1980 | Ueno et al. | 524/105 |
| 4,325,086 | 4/1980 | Sato et al. | 358/296 |
| 4,338,421 | 7/1980 | Maruyama et al. | 525/397 |
| 4,417,031 | 1/1982 | Aharoni et al. | 525/425 |
| 4,483,953 | 11/1984 | Axelrod | 525/152 |
| 4,654,405 | 12/1985 | Jalbert et al. | 525/391 |
| 4,672,086 | 12/1985 | Seller et al. | 524/127 |
| 5,116,905 | 5/1992 | Belfoure et al. | 525/67 |

FOREIGN PATENT DOCUMENTS

129825A2  6/1984  European Pat. Off. .
0253332  10/1987  United Kingdom .
WO8601511  9/1984  World Int. Prop. O. .

OTHER PUBLICATIONS

S. M. Abaroni "Rapid High Temperature Amidation in Presence of Organic Phosphits", Polymer Bull. 10, (1983) 210-214.

*Primary Examiner*—Jacob Ziegler
*Attorney, Agent, or Firm*—Richard C. Stewart, Jr.

[57] ABSTRACT

A process of forming block and/or graft copolymers of a polyester and a polyphenylene oxide which comprises heating a mixture of the polyester and the polyphenylene oxide in the presence of a phosphite compound.

25 Claims, No Drawings

PROCESS FOR PREPARING GRAFT AND BLOCK COPOLYMERS OF POLYPHENYLENE OXIDES AND POLYESTERS AND COPOLYMERS PREPARED BY SAID PROCESS

This application is a division of application Ser. No. 446,512, filed Dec. 4, 1989, now U.S. Pat. No. 5,124,411.

BACKGROUND OF THE INVENTION

1. Field of the Invention

This invention relates to a process for preparing graft and/or block copolymers. More particularly, this invention relates to a process for preparing block and/or graft copolymers of polyphenylene oxides and polyesters. Block and/or graft copolymers prepared in accordance with the process of this invention are capable of being fabricated into useful shaped articles of manufacture, e.g., films, molded articles, tapes, housings, ribbons, rods, laminates, panels, composites.

2. Description of the Prior Art

Polymer compositions are disclosed in the prior art as having many and varied uses in industrial and commercial applications. For example, these polymers can be fabricated into useful shaped articles, as for example, films, panels, gears, housing, skate boards and the like, through use of conventional molding and fabrication techniques.

The utility of a particular polymer for a particular application is very much dependent on the physical properties of the polymer. For example, polymers having increased molecular weights can be used in the formation of fibers and molded articles having superior properties. Fibers and molded articles made from such polymers have increased tensile strength, durability and impact resistance. Accordingly, processes for increasing the molecular weight of various polymers are valuable procedures in tailoring such polymers for optimization of such properties.

Similarly, various functional groups and polymer side chains, as well as the structural conformation of certain polymers, are factors which affect the physical characteristics of polymers and thus are also critical to the utility of these polymers. Thus, procedures for varying and controlling these functional groups, side chains and structural conformations are also valuable tools in tailoring polymers for specific uses and as such are valuable tools to those of skill in the polymer art.

Organophosphites such as triphenylphosphite are known to cause reaction of polymer blends of nylons and polyester such as nylon 6/poly(ethylene terephthalate) and nylon 6/poly (butylene terephthalate) to form graft or block copolymers. For example, U.S. Pat. No. 4,417,031 and S. Aharoni, *Polymer Bulletin*, 10 pp. 210–214 (1983) disclose a process for preparing block and/or graft co-polymers by forming an intimate mixture of a phosphite compound, two or more polymers at least one of which includes one or more amino functions, as for example nylon, and at least one of the remaining polymers includes one or more carboxylic acid functions as for example a polyester.

Moulding material also containing a polyphenylene ether, a polyester such as polyethylene terephthalate and/or polybutylene terephthalate and from 5 to 15% of one or more flame proofing agents selected from among alkali metal or alkaline earth metal phosphates, high-boiling phosphoric acid esters, phosphoric acid esters, phosphinic acid esters, phosphonous acid esters or organic phosphine oxides are known. U.S. Pat. No. 4,672,086 indicates that these moulding materials are self-extinguishing.

Compositions of polyphenylene oxide and thermoplastic plastic polymers are known. In particular, polyphenylene oxide and polyamides compositions have been made as indicated in the U.S. Pat. Nos. 3,379,792 and 4,338,421. Such compositions are brittle unless other additives are incorporated into the compositions.

Patents such as U.S. Pat. No. 4,315,086 and European Patent Application 0,129,825 disclose compositions of polyphenylene oxide, also known as polyphenylene ether, and polyamides. These disclosures indicate that it is known to include an additional additive to enhance the properties of the composition. It is conjectured that such an additive provides a reactive linkage between the polyphenylene oxide and the polyamide. This linkage has been presumed to be a graft linkage.

It is known that the impact resistance of thermoplastic polymers such as polyamide as for example nylon 6, and polyesters as for example poly(ethylene terephthalate) can be improved by blending with elastomeric polymers. It is also known to add elastomeric or rubbery polymers to blends of polyphenylene oxide and polyamides where such compositions contain grafting agents. This is disclosed in U.S. Pat. No. 4,325,086.

International Application PCT/US86/01511 and U.S. Pat. No. 4,654,405 teach blends of functional polyphenylene oxides, polyamides, and impact modifiers such as polystyrene-polybutadiene-polystyrene.

BRIEF SUMMARY OF THE INVENTION

In accordance with this invention, there is provided a process for forming a blend comprising polyphenylene oxide, polyester and graft and/or block copolymers of a polyphenylene oxide and a polyester which comprises the steps of:

(a) forming a mixture comprising at least one polyphenylene oxide, at least one polyester and an effective amount of one or more phosphite compounds of the formula:

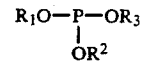

and/or symmetrical and asymmetrical diphosphite derivatives thereof, wherein:

$R_1$ is alkyl, phenyl or phenyl substituted with one or more substituents selected from the group consisting of alkyl, aryloxy, alkoxy, alkoxyalkyl, arylcarbonyl, haloaryl, trihalomethyl and alkylcarbonyl; and $R_2$ and $R_3$ are the same or different and are individually hydrogen, a metal cation, quaternary ammonium or R1; and (b) heating said mixture for a time and at a temperature sufficient to form said blend comprising said polyester, said polyphenylene oxide and said block and/or graft copolymer, and treating of said mixture and/or said blend, during, after or during and after said heating to remove all or a portion of the partially reacted phosphite by-products and unreacted phosphites contained in said mixture or blend.

As used herein, "an effective amount" is an amount of one or more phosphite compounds which is effective to cause the formation of the desired amount of the desired block and/or graft copolymers. The formation of the block and/or graft copolymer can be determined by treating the blend with a liquid which is a solvent for one of the polyphenylene oxide or the polyester and non-solvent for the other polymers and the block or graft copolymer in order to leach out the unreacted part of one polymer.

Another aspect of this invention relates to a new and improved blend of polyphenylene oxide and polyester having new and improved properties. While we do not wish to be bound by any theory, it is believed that the graft or block copolymer of the polyphenylene oxide and polyester function as compatibilizing agents which increase the interfacial bonding between the polyphenylene oxide and polyester domains in the blend. The blends of the invention exhibit improved mechanical properties as for example impact strength, tensile strength, tensile modulus, ultimate elongation, notch Izod and the like, when compared to blends made by other processes. The blends also exhibit improved thermal properties as evidenced by improved heat sag and heat deflection temperatures (HDT).

DETAILED DESCRIPTION OF THE INVENTION

The process of this invention is conveniently carried out in two steps. The first step of the process consists of heating a mixture of two or more polymers as described above and one or more phosphite compounds of the formula:

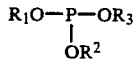

$$R_1O-P-OR_3$$
$$|$$
$$OR^2$$

wherein $R_1$, $R_2$, and $R_3$ are as described hereinabove. The mixture is heated at a temperature and for a time sufficient to form a blend comprising the desired block and/or graft copolymer and unreacted polyphenylene oxide and polyester and the blend, intimate mixture or both during, after or during and after heating is treated to remove all or a portion of the partially reacted phosphite compounds and unreacted phosphite compounds from the mixture and/or blend during heating, after heating or during and after heatinq. The formation of such copolymer is indicated by treating the reaction product with a solvent for one of the polymers (polyester or polyphenylene oxide) and which is a non-solvent for the other polymer and the block and/or graft copolymer.

The mixture can be formed using conventional techniques. For example, the mixture can be formed by solution techniques in which the polymers, organic phosphite compounds and optional components are dissolved in a suitable solvent afterwhich the solvent is removed by conventional procedures to provide the desired mixture. Alternatively, the mixture can be formed by dry blending techniques in which a fine powder or pellets of the polymers, and solid and/or liquid organic phosphite compounds and optional components are thoroughly mixed and then the mixture is heated to a temperature equal to or greater than the melting point of at least one of the polymers. In this embodiment of the invention, the intimate mixture is formed and heated in the same step.

The order of mixing of the various components of the intimate mixture is not critical. Accordingly, the order of addition of the polymers, phosphite compounds and other optional components to be described in more detail hereinbelow to form the intimate mixture, can be varied as desired. For example, the polymers and optional ingredients can be mixed or masterbatched in a melt, and the phosphite compounds can be added directly to the melt or at some subsequent point in the process. Alternatively, all essential and optional components can be intimately mixed and the mixture heated to form a melt, or the phosphite compound can be mixed or masterbatched with one or more of the essential polymers and/or optional ingredients, and the mixture heated to form a melt, and the remaining ingredients can be added as desired. In the preferred embodiment of this invention, a molten mixture of a polyphenylene oxide, a polyester, and optional ingredients is first formed to which is added an effective amount of one or more phosphite compounds. This can be accomplished by injection of the phosphite compounds into an extruder at a point where the polymers and other optional ingredients have been mixed and heated to form a molten mixture. This order of addition is preferred because it is believed that it results in a more uniform blending of the phosphite compound in the molten mixture resulting in a relatively superior product.

In a preferred embodiment of this invention, a "molten mixture" is formed. As used herein, a "molten mixture" is an intimate mixture which has been heated to a temperature which is equal to or greater than the melting point of at least one of the polymer components of the mixture. The manner in which the molten mixture is formed is not critical and conventional methods can be employed. For example, the molten mixture can be formed through use of conventional polymer and additive blending means, in which the polymeric components are heated to a temperature equal to or greater than the melting point of at least one of the polymers, and below the degradation temperature of each of the polymers. In a particularly preferred embodiment of this invention, a mixture of the polymers and optional components as for example an impact modifier such as a rubber, a polyester modifier such as polycarbonate or a polyestercarbonate, are heated above the melting point of each of the polymers in the mixture. An effective amount of one or more phosphite compounds, in a liquid or in powdered form is added to the melted polymers while at the same time vigorously stirring the melt, or added prior to melting and mixing. The phosphite compound is preferably added to the molten mixture. Heating is continued until the desired block and/or graft copolymers are formed.

In the most preferred embodiment, the components of the intimate mixture can be pelletized, and the pellitized components mixed dry in a suitable mixer, as for example, a tumbler or a Branbury Mixer, or the like, as uniformly as possible. Thereafter, the composition is heated in an extruder at a temperature at which the polymer components are melted. As described above, the mixture is heated in the extruder until the desired block and/or graft copolymers are formed in the desired amount, and is thereafter ejected with cooling.

Phosphite compounds useful in the conduct of the process of this invention are those of the formula:

$$P\begin{matrix}OR_1\\OR_2\\OR_3\end{matrix}$$

wherein $R_1$, $R_2$, and $R_3$ are as described herein above. Illustrative of such compounds are aliphatic and haloaliphatic phosphite compounds such as those wherein $R_1$, and $R_2$ and/or $R_3$ are the same or different and are t-butyl, n-butyl, isopropyl, trifluoromethyl, hexyl, trichloromethyl, pentyl, ethyl, neopentyl and the like. Aryl phosphite compounds are also useful in the conduct of the process of this invention. Illustrative of such useful aryl phosphite compounds are those in which $R_1$, $R_2$ and/or $R_3$ are the same or different and are phenyl, or phenyl substituted with one or more alkyl groups as for example, 3,5-di-tert-butylphenyl, 4-nonylphenyl, 4-tert-butylphenyl, 3-methoxybutylphenyl, 3-methoxyphenyl, 2-butoxyphenyl, 2-chloro-5-methylphenyl, 4-benzyloxyphenyl 2,6-diethoxyphenyl, 3,4-dipropoxyphenyl, 4-actyloxyphenyl, 3-propoxyphenyl, 4-methoxy-2-chlorophenyl, 2,4,5-trichlorophenyl, 4-isopropylphenyl, 2,4-dimethylphenyl, 3-ethylphenyl, 2,4-dimethylphenyl, 4-octyl phenyl and the like; with one or more halo groups, as for example, 4-chlorophenyl, 2,4-dibromophenyl, 4-fluorophenyl, 3,5-dichlororophenyl and the like; and with one or more alkyloarbonyl or arylcarbonyl groups as for example 2-methylcarbonyl phenyl, 4-benzyoylphenyl; and the like. Phosphite compounds in which $R_2$ and/or $R_3$ are cations such as hydrogen, sodium, potassium, zinc, lithium, calcium, barium, magnesium, aluminum, and other metal cations, and/or quaternary ammonium cations are also useful. Symmetrical and unsymetrical diphosphite derivatives of the above-referenced phosphite compounds can also be useful. Phosphite compounds for use in the particularly preferred embodiments of this invention are those in which $R_1$, $R_2$, and $R_3$ are the same, and amongst these particularly preferred embodiments those in which $R_1$, $R_2$ and $R_3$ are phenyl or substituted phenyl such as phenyl, 4-nonylphenyl, 3,5-di-tert butylphenyl and the like are the most preferred.

Useful phosphite compounds can be obtained from commercial sources or prepared in accordance with known preparative techniques. For example, phosphite compounds can be prepared by reaction of phosphorous trichoride with an appropriate alcohol or phenol in the presence of base. The phosphorous trichloride can be prepared by direct chlorination of phosphorous.

An effective amount of one or more phosphite compounds is employed in forming the mixture. As used herein, "an effective amount" is an amount of the phosphite compounds which when added to the polymeric component in accordance with this invention forms a mixture which when heated in the second step of the process of this invention forms the desired block and/or graft copolymers. In the preferred embodiments of this invention, the quantity of the one or more phosphite compounds employed is at least about 0.05 wt %, based on the total weight of the mixture. In the particularly preferred embodiments of this invention, the wt % of phosphite compounds is in the range of from 0.1 to about 10 wt %, and amongst these particularly preferred embodiments, those in which the quantity of phosphite compound employed is from about 0.2 to about 2 wt % based on the total weight of the mixture are most preferred.

Polymers which are useful in the conduct of the process of this invention are polyphenylene oxides and polyesters. The type of polyester is not critical and the particular situation will depend essentially on the physical properties and features, i.e., tensile strength, modulus and the like, desired in the blend. Thus, a multipliciy of linear polyesters having wide variations in physical properties are suitable for use in the process of this invention.

The particular polyester chosen for use can be a homo-polyester or a co-polyester, or mixtures thereof as desired. Polyesters which are suitable for use in the invention are those which are derived from the condensation of aromatic, cycloaliphatic, and aliphatic diols with aromatic dicarboxylic acids.

Exemplary of useful polyesters which can be utilized in the practice of this invention are poly(ethylene terephthalate), poly (butylene terephthalate), poly[ethylene(2,7-naphthalate)], poly(metaphenylene isophthalate), poly(dimethylpropiolactone), poly(parahydroxybenzoate) (Ekonol), poly(ethylene oxybenzoate) (A-tell), poly(ethyleneisophthalate), poly(hexamethylene tetramethylene terephthalate), poly(hexamethylene terephthalate), poly(decamethylene terephthalate), poly(1,4-cyclohexane dimethylene terephthalate), poly(ethylene 1,5-naphthalate), and poly(ethylene 2,6-naphthalate).

Polyester compounds prepared from the condensation of aliphatic diols and an aromatic dicarboxylic acid are preferred for use in this invention. Illustrative of such useful aromatic carboxylic acids are terephthalic acid, isophthalic acid and o-phthalic acid, 1,5-naphthalenedicarboxylic acid, 1,4-naphthalenedicarboxylic acid, 2,6-naphthalenedicarboxylic acid, or 2,7-naphthalenedicarboxylic acid, 4,4'-di-phenyldicarboxylic acid, 4,4'-diphenysulphone-dicarboxylic acid, 1,1,3-trimethyl-6-carboxy-3-carboxyphenyl)-indane, diphenyl ether 4,4'-dicarboxylic acid, bis(p-carboxyphenyl)methane and the like. Of the aforementioned, aromatic dicarboxylic acids based on an aromatic ring such as terephthalic acid, isophthalic acid, naphthalene 2,6-dicarboxylic acid, orthophthalic acid are preferred for use and amongst these preferred acid precursors, terephthalic acid is particularly preferred.

In the most preferred embodiments of this invention, poly(ethylene terephthalate), and poly(butylene terephthalate) are the polyesters of choice. Among these polyesters of choice, poly(ethylene terephthalate) is most preferred.

The molecular weight of useful polyesters or their solution or intrinsic viscosities (IV) may vary widely. In general, the IV of useful polyesters is at least about 0.3 or determined from a one point determination of [n] from 0.5% polyester solution in phenyol tetrachloroethylene (60:40 by weight) at 25° C. In the preferred embodiments of the invention, the IV of the polyester is from about 0.3 to about 1.3, and in the particularly preferred embodiments of the invention the IV is from about 0.4 to about 1.1. In the most preferred embodiments of the invention, the IV is from about 0.7 to about 1.0.

Polyesters useful in the practice of this invention can be obtained from commercial sources or prepared by known techniques. For example, polyester can be obtained from Allied-Signal Inc. under the tradename Petra ® or prepared by the condensation of an appropriate diester such as dimethyl terephthalate and a diol such as ethylene glycol in the presence of a catalyst such as a manganese acetate-antimony oxide mixture.

Polyphenylene oxides useful in the practice of this invention may vary widely. Illustrative of useful polyphenylene oxides are those having recurring monomeric units of the formula:

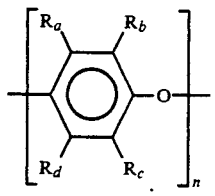

wherein:

n is an integer of at least about 20 and preferably at least about 50; and $R_a$, $R_b$, $R_c$ and $R_d$ are the same or different and are groups such as hydrogen or hydrocarbon which may optionally include one or more divalent oxygen atoms such as alkyl as for example, methyl, ethyl, propyl, pentyl, octyl, neopentyl, isopropyl, sec-butyl, dodecy and the like; alkoxy such as methoxy, propoxy, nonoxy, isopropoxy and the like: alkoxyalkyl such as methoxymethyl, ethoxymethyl, butoxymethyl, propoxyethyl, methoxylbutyl and the like; aryl such as phenyl; aryloxy such as phenoxy; aryloxyalkyl and aryloxyaryl such as phenoxyphenyl, phenoxymethy, and the like; haloalkyl such as trifluoromethyl, trichloromethyl, and the like; halogen such as bromo, chloro, fluoro and the like; alkoxyaryl, alkylaryl and arylalkyl groups such as 4-methoxyphenol, 4-methylbenzyl, 2,4-dimethylphenyl, benzyl, phenethyl and the like; and cycloalkyl such as cyclohexyl, cyclopentyl, cyclooctyl, cycloheptyl and the like.

Illustrative of useful polyphenylene oxides are those described in U.S. Pat. No. 3,306,875; 4,315,086; 3,360,875; 3,337,501; and 3,787,361. Such illustrative polyphenylene oxides include poly(1,4-phenylene oxide), poly(2,6-dimethyl-1,4-phenylene oxide), poly(2,6-diphenyl-1,4-phenylene oxide), poly(2,6-dimethyl-1,4-phenylene oxide), poly (2-methyl-1,4-phenylene oxide), poly(3-methyl-1,4-phenylene oxide), poly(2,6-diluaryl-1,4-phenyleneoxide), poly(2,6-dimethoxy-1,4-phenylene oxide). poly(2,6-diethoxy-1,4-phenylene oxide), poly(2-methoxy-6-ethoxy-1,4-phenylene oxide), poly(2,6-dibenzyl-1,4-phenylene oxide), poly(2,6-diethyl-1,4-phenylene oxide), poly(2,6-dipropyl-1,4-phenylene oxide), poly(2,3,6-trimethyl-1,4-phenylene oxide), poly(2,3,5,6-tetramethyl-1,4-phenylene oxide), poly(2,6-dichloro-1,4-phenylene oxide), poly(2,6-diphenyl-1,4-phenylene oxide), and poly(2,6-dipropyl-1,4-phenylene oxide).

Preferred for use in the practice of this invention are polyphenylene oxides in which $R_b$ and $R_c$ are substituents other than hydrogen, preferably alkyl or phenyl and more preferably linear alkyl having from 1 to about 4 carbon atoms. Illustrative of such preferred polyphenylene oxides are poly(2,6-dimethyl-1,4-phenylene oxide), poly(2,6-diethyl-1,4-phenylene oxide), poly(2,6-diphenyl-1,4-phenylene oxide), poly(2-methyl-6-ethyl-1,4-phenylene oxide), poly(2-methyl-6-propyl-1,4-phenylene oxide), poly2,6-dipropyl-1,4-phenylene oxide), poly(2-ethyl-6-propyl-1,4-phenylene oxide), and the like. The most preferred polyphenylene oxide is poly(2,6-dimethyl-1,4-phenylene) oxide.

The molecular weight or solution viscosity or intrinsic viscosity (IV) of useful polyphenylene oxides may vary widely. In general, the IV of useful polyphenylene oxides is at least about 0.2 as measured from the extrapolation of four concentrations (0.57% maximum)) of the polyphenylene oxide in trichloromethane ($CHCl_3$) at 25° C. to obtain [n] in accordance with ASTM D2857.

In the preferred embodiments of the invention, the IV of the polyphenylene oxide is from about 0.2 to about 1, and in the particularly preferred embodiments of the invention useful polyphenylene oxides have an intrinsic viscosity (IV) of from about 0.2 to about 0.85. In the most preferred embodiments of the invention, the intrinsic viscosity (IV) is from about 0.3 to about 0.6.

Useful polyphenylene oxides can be obtained from commercial sources. For example, poly(2,6-dimethyl-1,4-phenylene) can be obtained from General Electric Inc. under the tradename Noryl ® and from Sumitomo, Ltd. under the tradename PPE ®.

Useful polyphenylene oxides can also be prepared by known preparative techniques. For example, useful preparative techniques include aromatic nucleophilic substitution. Similarly, U.S. Pat. No. 4,315,086 describes a method to prepare polyphenylene oxide polymers suitable for use in the practice of this invention. In this method, the polyphenylene oxide polymer is formed by oxidation-polymerization of one or more phenol compounds as for example 2,6-dimethylphenol, 2,6-dipropoxyphenol, 2,6-diethoxy-phenol, 2,6-dipropylphenol 2-methyl-6-phenyl phenol, 2,6-diphenylphenol, 2,6-diethylphenol, 2-methyl-6-ethyl-phenol, 2,3,6-trimethylphenol, 2,4,6-trimethyl-phenol and the like with oxygen or an oxygen-containing gas in the presence of an oxidation-coupling catalyst such as a catalyst comprising a cuprous salt and a tertiary amines (e.g., cuprous chloride-trimethylamine, cuprous acetate-triethylamine, cuprous chloride-pyridine), catalysts comprising cupric salt-tertiary amines and alkaline metal hydroxide), catalysts comprising manganese salts and a primary amine (e.g., manganese chloride-ethanolamine, manganes acetate-ethylene diamine), catalysts comprising a manganeses salt and an alcoholate or phenolate (e.g., manganese chloride-sodium methylate, manganese chloride-sodium phenolate) and catalysts comprising a combination of a cobalt salt and a tertiary amine.

The amount of polyester and polyphenylene oxide in the mixture may vary widely. In general, the amount of each of the polyester and polyphenylene oxide may vary from about 10 to about 90% by weight based on the total weight of the mixture. In the preferred embodiments of the invention, the amount of each of the polyester and polyphenylene oxide may vary from about 20 to about 80% by weight based on the total weight of the mixture, and in the particularly preferred embodiments of the invention the amount of each of the polyester and polyphenylene oxide contained in the mixture in from about 30 to about 60% by weight on the aforementioned basis.

Various optional ingredients can be added to improve the mechanical properties of the blend. For example, in the preferred embodiments of the invention, the mixture includes a material to decrease the crystallinity of the polyester component such as a polycarbonate or polyestercarbonate homopolymer or copolymer. Polycarbonates and polyestercarbonates are known materials which can be obtained from commercial sources or prepared by known techniques. Illustrative of such polycarbonate containing polymers and polycarbonates and polyestercarbonates such as poly[methane bis(4-phenyl) carbonate], poly[1,1-ethane bis(4-phenyl)carbonate], poly[2,2-propane bis(4-phenyl)carbonate], poly[1,1-butane bis(4-phenyl)carbonate.], poly[1,1-(2-methylpropane) bis (4-phenyl)carbonate], poly[2,2-butane bis(4-phenyl) carbonate], poly[1,1-(1-phenylethane) bis 4-phenylcarbonate], poly[diphenylmethane bis(4-phenyl)carbonate], and the like; and polyester carbonates such as those described in U.S. Pat. Nos. 4,156,069, 4,386,196 and 4,612,362.

The carbonate containing polymers function to decrease or reduce the crystallinity of the polyester component. In general, the amount of such polymers added should be sufficient to provide this function. The amount of carbonate containing polymer added is usually from about 5 to about 40% by weight based on the total weight of the polyester, and is preferably from about 10 to about 35% by weight, more preferably from about 15 to about 30% by weight and most preferably from about 20 to about 30% by weight on the aforementioned basis.

In the preferred embodiments of this invention in acid scavenger in added to the mixture before heating, after heating or both. The acid scavenger is added to neutralize any acidic products formed from the reacted phosphite which may be in the reaction mixture after the heat grafting step. The type of acid scavenger used is not critical and may vary widely. Illustrative of useful acid scavengers are metal oxides and hydroxides such as calcium oxide, magnesium oxide, barium oxide, calcium hydroxide, magnesium hydroxide, and the like.

The amount of acid scavenger employed is usually from about 0.01 to about 3% by weight based on the total weight of the intimate mixture. In the preferred embodiments of the invention, the amount of acid scavenger is from about 0.05 to about 2% by weight based on the total weight of the intimate mixture, and in the particularly preferred embodiments is from about 0.1 to about 1.5% by weight on the aforementioned basis.

In the preferred embodiment of this invention an elastomeric or rubbery polymer is included in the intimate blend because it has a positive affect on the impact resistance of the blend. The rubbery or elastomeric polymer is defined as having an ASTM D-638 tensile modulus of less than about 40,000 psi (276 MPa), preferably, less than 20,000 psi (138 MPa). It can be a block or graft copolymer. Useful rubbery polymers can be made from reactive monomers which can be part of the polymer chains or branches, or grafted on to the polymer. These reactive monomers can include dienes, and carboxylic acids and derivatives thereof such as esters and anhydries. Such rubbery polymers include natural rubber, nitrile rubber, polyacrylates, butadiene polymers, isobutylene/isoprene copolymer, styrene/ethylene/propylene/diene copolymers, acrylonitrile/stryrene/diene copolymers, ethylene/styrene/diene copolymers, butadiene/styrene copolymers, styrene/butadiene/styrene copolymers, acrylonitrile/butadiene/styrene copolymers, poly(chloroprene), acrylonitrile/butadiene copolymers, poly(isobutylene), isobutylene/butadiene copolymers, ethylene/propylene copolymers, polyneoprene, ethylene/propylene/butaldiene copolymers, and wholly or partially hydrogenerated oxidized or carboxylated derivatives. Useful rubbery polymers can include monomeric units derived from aromatic vinyl monomers, olefins, acrylic acid, methacrylic acid and their derivatives. Useful rubbery polymers and their preparation are disclosed in U.S. Pat. Nos. 4,315,086 and 4,175,358.

Preferred rubbers for use in the practice of this invention are carboxylated rubbers such as rubber resulting from the reaction of rubbers with anhydrides such as maleic anhydrides, and the like; by reaction with ozone followed by oxidation with an agent such as permanganate; and grafting of double bond unsaturated monomers having pendant carboxylic acid functions such as acrylic acid, methacrylic acid and the like.

Particularly preferred rubbers are maleated rubbers, especially where the rubbers are simple tri-block copolymers of the type A-B-A, or multiblock copolymers of the type $(AB)_n$, when n is 2 to 10, x is 3 to 150 "A" is a block derived from a polyvinylaromatic monomer such styrene or vinyl toluene, and "B" is a block derived from a conjugatated diene elastomer. Many of these elastomers are produced commercially by the Shell Chemical Co. under the tradename Kraton ®.

The elasomeric material functions to improve the impact resistance of the blend. In general, the amount of such elastomeric materials added should be sufficient to provide this function. The amount of elastomeric materials is usually from about 2.5 to about 25% by weight based on the total weight of polyester and polyphenylene oxide, and is preferably from about 3 to about 18% by weight, more preferably from 5 to about 15% by weight and most preferably from about 7 to about 12 % by weight on the aforementioned basis.

Various other optional ingredients, which are normally included in polymer compositions, may be added to the mixture at an appropriate time during the conduct of the process. For example, these optional ingredients can be added either prior to or after melting of the polymers in the first step of the process of this invention; or after the conduct of the second step in which the desired block and/or graft copolymers have been formed. Such optional components include fillers, plasticizers, impact modifiers, colorants, including dyes and pigments, mold release agents, antioxidants, ultraviolet light stabilizers, lubricants, antistatic agents, fire retardants, nucleating agents, oxidative and thermal stabilizers and the like. These optional components are well known to those of skill in the art, accordingly, will not be described herein in any detail.

In the second step of the process of this invention the mixture is heated at a temperature and for a time sufficient to form a blend comprising said block and/or graft copolymer and treating said mixture, said blend or both during, after or during and after said heating to remove all or a portion of the partially reacted phosphite byproducts and unreacted phosphite compound from said mixture, said blend or both.

Temperatures used in the heating step can be varied over a wide range. However, it should be appreciated that the temperature employed in any specific instance will depend on the particular polymers employed and, in the preferred embodiments should be at least as high as the melting point of the polymers and below the degradation temperature of the polymers. In the preferred embodiments of this invention, the temperature is such that the polymer will remain in the molten state as the block and/or graft copolymers are formed. Normally this can be accomplished in one of two ways. Either the heating step can be carried out at a temperature which is equal to or greater than the melting point of the desired product; or temperatures can be increased periodically over the course of the conduct of the heating step so as to maintain the mixture in the molten state. In the particularly preferred embodiments of this invention, employing particularly preferred polymer compositions, the temperature is at least about 150° C. Amongst these particularly preferred embodiments, most preferred temperatures are in the range of from about 200° C. to about 300° C.

Similarly, pressures are not critical and can be varied widely without adversely affecting the process. Consequently, the heating step can be conducted at sub-atmospheric, atmospheric or super-atmospheric pressures. In the preferred embodiments of the invention, at least a portion of the heating step is carried out at reduced pressure, which enhances the effectiveness of removing all or a portion of the volatile by-products.

The heating step is carried out for a time sufficient to from the desired block and/or graft copolymers. In general, the intimate mixture is heated until at least about 1 wgt % of the polymer in the minor amount (based on the total amount of the polymer added) has been reacted. In the preferred embodiments of the invention, the heating step is continued until from about 2 to about 50 wgt % of the polymer in the minor amount (based on the total amount of the polymer added) has been reacted, and in the particularly preferred embodiments, the heating step is continued until from about 5 to about 40 wgt % of the polymer in the minor amount (on the aforementioned basis) has been reacted. In the most preferred embodiments, the heating step is continued until from about 10 to about 30 wgt % of the polymer in the minor amount (based on the total amount of polymer added) has been reacted.

Reaction times can be varied over a wide range. Usually, reaction times will depend on a variety of factors such as the polymeric components, reaction temperatures, phosphite component and its concentration, and other factors know to those of skill in the art to affect reaction times. In most instances, the reaction time can vary from a few seconds to 24 hrs. or more. In the preferred embodiments of this invention, reaction times will vary from about 1 mins. to about 2 hrs and in the particularly preferred embodiments from about 2 mins. to about 5 to 20 mins.

Best results are obtained when the process of this invention is carried out in the presence of as little water as possible. Ideally, the conditions will be anhydrous, and this represents the most preferred embodiment of the invention. However, good results can be obtained when as much as about 0.165 wt % water based on the total weight of the mixture is present therein. In the preferred embodiments, the wt % of water is equal to or less than about 0.1 wt %, and in the particularly preferred embodiments, the wt % of water is equal to or less than about 0.05 wt % on the same basis.

The intimate mixture, the product of the block and/or graft copolymer, polyester and polyphenylene oxide or both are treated during, after or during and after the heating step to remove by-products. While we do not wish to be bound by in any theory, it is believed that in facilitating the reaction of the polyester and the polyphenylene oxide the organic phosphite produces partially reacted phosphite by-products such as species of the formulas $(R_1O)(R_2O)POH$, $(R_1O)(R_3)POH$, $(R_2O)(R_3)POH$, $R_1OP(OH)_2$, $R_2OP(OH)_2$ and/or $R_3OP(OH)_2$. Removal of the partially reacted phosphite by-products and unreacted phosphite compounds enhances the effectiveness of the grafting process and improves the mechanical and thermal properties of the resulting blend. Ideally, all or substantially all of the partially reacted phosphite by-products and ureacted phosphite compounds are removed from the mixture and/or blend, and this represents the most preferred embodiments of the invention. However, it is believed that good results can be obtained when the amount of such partially reacted and unreacted phosphite compounds is as high as about 0.165 wt % based on the total weight of the mixture, or blend, whichever is applicable. In the preferred embodiments of the invention, the amount of partially reacted and unreacted phosphite compounds is equal to or less than about 0.1 wt % and, in the more preferred embodiments of the invention, the amount of partially reacted and unreacted phosphite compounds is equal to or less than about 0.05 wt % on the aforementioned basis.

Any conventional means for removal of these by-products which does not adversely affect the properties of the blend can be used. In the preferred embodiments of this invention, all or a portion of these partially reacted phosphite by-products and unreacted phosphite compounds are conveniently removed by conducting a portion of the heating step (preferably after the reaction goes to at least about 50% of completion) under reduced pressure, preferably as close to full vacuum as possible.

The process of this invention is preferably carried out in the absence of air, as for example, in the presence of an inert gas, such as argon, carbon dioxide, nitrogen or the like. The process can be carried out in a batchwise or discontinuous fashion, as for example, carrying out the process in a sealed container. Alternatively, the process can be carried out in a continuous fashion in a single processing zone, as for example, by use of a single zone extruder as described hereinabove, or in a plurality of such reaction zones as for example a multi zone extruder, in series or parallel.

The process of this invention provides compositions comprising graft and/or block copolymers that have improved mechanical properties high impact resistance and which are thermoplastic materials from which molded articles of manufacture having valuable properties can be produced by the conventional shaping processes, such as casting, injection molding and extruding. Examples of such moldings are components for technical equipment, housing panels, apparatus casing, household equipment, sports equipment, components for the electrical and electronice industries and electrical insulations, car components, and semi-finished products which can be shaped by machining. The polymer compositions according to the invention are outstandingly suitable for specific applications of all types since their spectrum of properties ca be modified in the desired direction in manifold ways.

Compositions prepared in accordance with the process of this invention are outstandingly suitable for the production of sheets and panels having valuable properties. The sheets and panels prepared from such compositions are suitable as costing materials for other materials comprising, for example, wood, glass, ceramic, metal or other plastics, and outstanding strengths can be achieved using conventional adhesion promoters, as for example, promoters based on vinyl resins. The sheets and panels can also be laminated with other plastic films and this is preferably effect by joint extrusion, the sheets being bonded in the molten state. The surfaces of the sheets and panels, including those in the embossed form, can be improved or finished by conventional methods, as for example, by lacquering or by the application of protective films. The compositions prepared in accordance with the process of this invention can be made into films with or without fillers, which may be transparent or translucent.

The following specific examples are presented to more particularly illustrate the invention, and should not be construed as being limitations on the scope and spirit of the invention. In the examples, all weight percents are based on the total weight of the mixture.

EXAMPLES 1 TO 14

A. PPO-PET Blending in the Sterling Extruder. The poly(2,6-dimethyl-1,4-phenylene oxide), (PPO), polycarbonate (PC), polyethylene terephthalate (PET), and rubber were ground to form a powder using a Wiley mill (with a 2 mm screen). All the components were then bag-mixed, placed on trays, in a 1 in thick layer and dried in a vacuum an oven at 160° C. overnight. The extrusion temperature was 280° C. with a screw rate of 63 rpm. Initially, the triphenyl phosphite (TPP) pump was initiated to give roughly a 3% feed-rate. The dried solid components were fed into the extruder via a K-Tron feeder. The vacuum pump connected to the decompression zone of the extruder was started. Nitrogen was always used, to blanket the dry powder in the feeder and hopper areas. When a through-put rate was established to be 42.3 g per min, the TPP feeding rate was adjusted to exactly 3% relative to the solid feed. When the extrusion process had stabilized, the extrudates were collected as pellets by slight melt drawing, air cooling and chopping. The pellets were sealed in dry bottles. A similar procedure was applied to pelletized feeds.

B. Separation of Unreacted PPO from the Blend. A sample of the pellets of the blend was ground to a fine powder using a Wiley mill. About 5-8 gm of the powder was placed in a small Erlenmeyer flask with 100 mL of chloroform. The contents were stirred for at least 5 hrs. The solids were recovered by filtration and were transfered into a flask together with 50 mL of chloroform. The chloroform was heated to reflux for 2-3 hrs. The solids were recovered by filtration and washed with more chloroform. The chloroform washings and filtrates were combined and evaporated to dryness. The samples were dried in a vacuum over at 166° C. overnight. The chloroform insoluble fraction corresponds to all PET containing materials while the soluble fraction remains almost totally PPO.

C. Property Evaluation. The heat deflection temperature (HDT) of the blends at 264° C. and 66° C., the tensile strength, impact resistance, heat sag, Notch Izod, tensile modulus and ultimate elongation (UE) of the various blends were evaluated. The HDT was evaluated by the procedure of ASTM-D-648; the tensile strength was evaluated by the procedure of ASTM-D-638; the impact resistance by the procedure of ASTM-D-3029; the notch izod by the procedure of ASTM-D-256; the tensile modulus by the procedure of ASTM-D638; and the ultimate elongation by the procedure of ASTM-D638.

The results of the various evaluation and the % composition of the various test compositions are set forth in the following Table I.

TABLE I

| Ex. No. | PPO (% by wt) | PET (% by wt) | Rubber (% by wt) | TPP (% by wt) |
|---|---|---|---|---|
| 1 | 38.5 | 38.5 | 10 | 3 |
| 2 | 40 | 40 | 7 | 3 |
| 3 | 38.5 | 38.5 | 10 | 3 |
| 4 | 38.5 | 38.5 | 10 | 1.5 |
| 5 | 40 | 40 | 10 | 0 |
| 6 | 44.5 | 44.5 | 11 | 0 |
| 7 | 43.5 | 43.5 | 0 | 3 |
| 8 | 43.5 | 43.5 | 10 | 3 |
| 9 | 48.5 | 38.5 | 10 | 3 |
| 10 | 50 | 40 | 7 | 3 |
| 11 | 38.5 | 48.5 | 10 | 3 |
| 12 | 40 | 50 | 7 | 3 |
| 13 | 43.5 | 43.5 | 10[5] | 3 |
| 14 | 41 | 41 | 10 | 3 |

| Ex. No. | PC (% by wt) | Tensile Strength[2] (ksi) | UE (%) |
|---|---|---|---|
| 1 | 10 | 7.2 | 75 (0.2) |
| 2 | 10 | 9.0 | 13 (0.2) |
| 3 | 10 | 8.3 | 15 (2) |
| 4 | 10 | 7.8 | 25 (2) |
| 5 | 10 | 6.2 | 6.4 (0.2) |
| 6 | 0 | 5.1 | 14.3 (0.2) |
| 7 | 10 | 9.9 | 3.0 (2) |
| 8 | 0 | 8.5 | 14 (2) |
| 9 | 0 | 8.5 | 6.4 (2) |
| 10 | 0 | 8.3 | 3 (0.2) |
| 11 | 0 | 7.3 | 11 (0.2) |
| 12 | 0 | 8.9 | 5.3 (0.2) |
| 13 | 0 | 6.4 | 2.4 (0.2) |
| 14 | 5[7] | 8.1 | 16 (2) |

| Ex. No. | HDT (26° C.) | HDT (66° C.) | Notch Izod |
|---|---|---|---|
| 1 | 114 | 150 | 4.9 |
| 2 | 118 | 161 | 1.8 |
| 3 | 118 | 160 | 3.0 |
| 4 | 115 | 154 | 3.7 |
| 5 | 99 | 136 | 1.4 |
| 6 | 91 | 146 | 1.2 |
| 7 | 124 | 145 | 0.3 |
| 8 | 142 | 172 | 4.2 |
| 9 | 155 | 177 | 2.1 |
| 10 | 162 | 185 | 1.1 |
| 11 | 107 | 170 | 2.1 |
| 12 | 147 | 177 | 2.1 |
| 13 | 155 | 184 | 0.5 |
| 14 | 104 | N/A | 2.6 |

| Ex. No. | Impact (ft-lb) | Heat[3] Sag (in) | Tensile Modulus (ksi) |
|---|---|---|---|
| 1 | 106.0 | 2.56[4] | 253 |
| 2 | 23.0 | NA | 297 |
| 3 | 31.9 | 2.03 | 272 |
| 4 | 25.5 | 1.63 | 252 |
| 5 | 6.4 | 1.55 | 211 |
| 6 | 9.3 | 0.89 | 163 |
| 7 | 3.2 | 1.82 | 375 |
| 8 | 2.2 | 1.08 | 274 |
| 10 | 0.9 | 0.63 | 307 |
| 11 | 7.2 | 1.20 | 251 |
| 12 | 4.0 | 0.82 | 297 |
| 13 | 0.9 | 0.63 | 285[6] |
| 14 | 33[8] | 2.2 | 296 |

Footnotes:
[1]PPO, PET, rubber and PC were in powder form except for the blend in Item 1 where PET, rubber and PC were pellets.
[2]Tensile strength and U.E. reports in 2 and/or 0.2 in/min crosshead speed.
[3]Heat sag results reported in inches measured at 188° C., 60 min. duration with 6 in. overhang.
[4]Heat sag should be better and gate of mold corrected since this sample.
[5]Rubber was Kraton ® G2821S.
[6]Samples fractured.
[7]Polyestercarbonate instead of a polycarbonated.
[8]½ in. ball.

What is claimed is:

1. A process for forming a blend comprising a polyester, a polyphenylene oxide, a carbonate polymer selected from the group consisting of polycarbonates and polyester carbonates and a copolymer comprising blocks of said polyester and said polyphenylene oxide, said process comprising:

(a) forming a mixture comprising at least one polyphenylene oxide, at least one polyester, a carbonate polymer selected from the group consisting of polycarbonates and polyester carbonates and an effective amount of one or more phosphite compounds selected from the group consisting of compounds of the formula

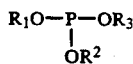

symmetrical diphosphite derivatives thereof and asymmetrical diphosphite derivatives thereof, wherein:

$R_1$ is alkyl, phenyl or phenyl substituted with one or more substitutents selected from the group consisting of alkyl, haloaryl, alkylcarbonyl, alkoxy, arylcarbonyl, trihalomethyl, aryloxy, and alkoxylalkyl; and $R_2$ and $R_3$ are the same or different and are hydrogen, a metal cation, a quaternary ammonium carbon or $R_1$; and (b) heating said mixture for a time and at a temperature sufficient to form a blend comprising said polyester, said carbonate polymer, said polyphenylene oxide and said copolymer and treating said mixture, said blend or a combination thereof during, after or during and after said heating to remove all or a portion of the partially reacted phosphite by-products and unreacted phosphite compounds from said mixture, said blend or said combination thereof.

2. A process according to claim 1 wherein $R_1$, $R_2$ and $R_3$ are the same and are phenyl or substituted phenyl.

3. A process according to claim 2 wherein $R_1$, $R_2$ and $R_3$ are the same and are phenyl or phenyl substituted with one or more alkyl or alkoxy substituents.

4. A process according to claim 1 wherein the amount of said phosphite compounds is at least about 0.05 wt % based on the total weight of the mixture.

5. A process according to claim 4 wherein said amount is from about 0.1 to about 10 wt %.

6. A process according to claim 5 wherein said amount is from about 0.2 to about 2 wt %.

7. A process according to claim 1 wherein said polyester is selected from the group consisting of poly(ethylene terephthalate), poly(butylene terephthalate) and poly(1,4-cyclohexane dimethylene terephthalate).

8. A process according to claim 7 wherein said polyester is poly(ethylene terephthalate).

9. A process according to claim 1 wherein said polyphenylele oxide is selected from the group consisting of poly(2,6-dimethyl-1,4-phenylene oxide), poly(2,6-diphenyl-1,4-phenylene oxide), and poly(diethyl-1,4-phenylene oxide).

10. A process according to claim 9 wherein said polyphenylene oxide is poly(2,6-dimethyl-1,4-phenylene) oxide.

11. A process according to claim 1 wherein the amounts of said polyester and said polyphenylene oxide are from about 10 to about 90% by weight based on the total weight of the mixture.

12. A process according to claim 11 wherein said amounts are from about 20 to about 80% by weight.

13. A process according to claim 12 wherein said amounts are from about 30 to about 50% by weight.

14. A process according to claim 1 wherein the amount of said carbonate polymer is from about 5 to about 40% by weight based on the total weight of the mixture.

15. A process according to claim 1 wherein said mixture further comprises a rubbery or elastomeric polymer.

16. A process according to claim 15 wherein said rubbery or elastomeric polymer is carboxylated.

17. A process according to claim 16 wherein said rubbery or elastomeric polymer is diene/aromatic vinyl monomer copolymer.

18. A process according to claim 1 wherein said mixture, blend or both are heated at reduced pressure.

19. A process according to claim 1 wherein said mixture is heated until from about 3 to about 50% of the polymer in the minor amount (based on the total weight of the polymer added) has been reacted.

20. A process according to claim 1 wherein said polyester is poly(ethylene terephthalate), said poly(phenylene oxide) is poly(2,6-dimethyle-1,4-phenylene oxide) and said phosphite compound is a triaryl phosphite.

21. A process according to claim 1 wherein all or substantially all of the partially reacted phosphite by-product and unreacted phosphite compounds are removed from said mixture, said blend or from said combination.

22. A process according to claim 21 wherein the amount of said partially reacted phosphite by-product and unreacted phosphite compounds remaining in said blend is equal to or less than about 0.165 wt % by weight of the blend.

23. A process according to claim 22 wherein said amount is equal to or less than about 0.1 wt % by weight of the blend.

24. A process according to claim 23 wherein said amount is equal to or less than about 0.05 wt % by weight of the blend.

25. A process according to claim 20 wherein said triaryl phosphite is triphenyl phosphite or trialkylphenyl phosphite.

* * * * *